A. METOSH.
TRAIN PIPE COUPLING.
APPLICATION FILED AUG. 26, 1910.
997,076.
Patented July 4, 1911.
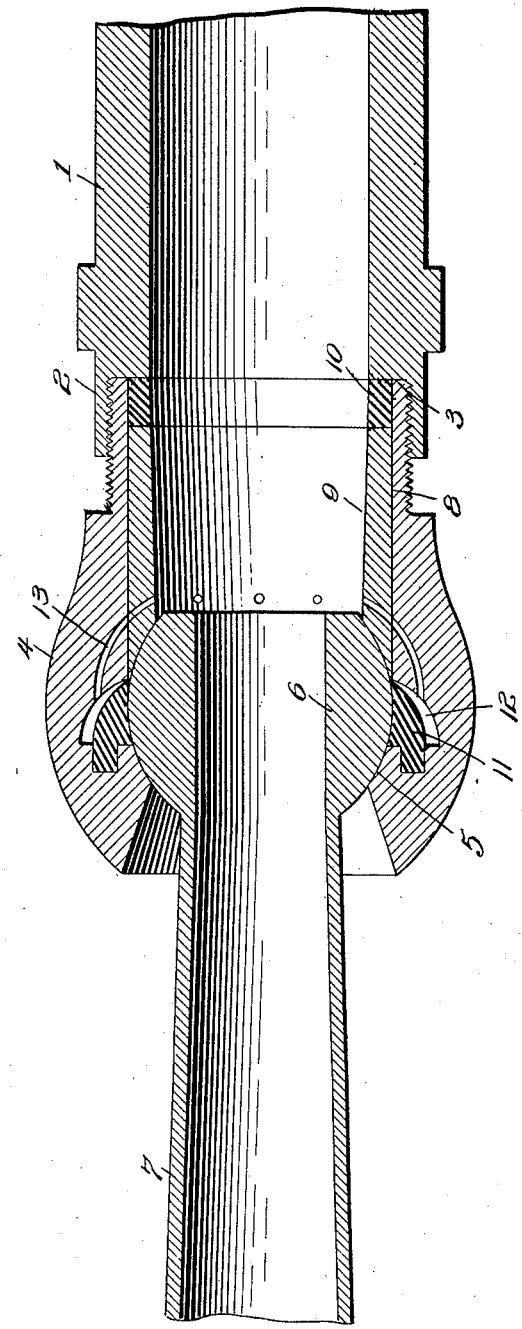
Witnesses
F. C. Gibson.
Inventor
Anthony Metosh.
By Victor J. Evans
Attorney

UNITED STATES PATENT OFFICE.

ANTHONY METOSH, OF EAST SYRACUSE, NEW YORK, ASSIGNOR TO FRANK B. METOSH, OF EAST SYRACUSE, NEW YORK.

TRAIN-PIPE COUPLING.

997,076.      Specification of Letters Patent.      Patented July 4, 1911.

Application filed August 26, 1910. Serial No. 579,011.

*To all whom it may concern:*

Be it known that I, ANTHONY METOSH, a citizen of the United States, residing at East Syracuse, in the county of Onondaga and State of New York, have invented new and useful Improvements in Train-Pipe Couplings, of which the following is a specification.

This invention relates to train pipe couplings and particularly to the means for keeping the gaskets in air-tight position against the coupling head.

Further objects of the invention will appear as the specific description which follows is read in connection with the accompanying drawing which forms a part of this application, and in which the figure shown is a longitudinal section taken through the center of a train pipe and its coupling head.

Referring more particularly to the drawing 1 represents the ordinary pipe which has secured thereover a steel or other strong metal clip 2 in which is provided an annular shoulder 3 for the reception of the coupling head 4. The coupling head is socketed as at 5 to receive the ball 6 which works in the same and which is connected at its opposite end to a continuation 7 which of course is understood to be mounted upon the adjoining car. The head is formed with a central aperture running therethrough which communicates with a similar central aperture in the ball 6 and thereby affords communication with the pipe. The central aperture through the head is illustrated at 8 and is of a diameter sufficient to permit the entrance of the ball 6. In order to hold the head in proper position, I place a metal ring of exterior cone-shape 9 in the passage 8 and superpose a washer 10 of annular form which abuts against the shoulder 3.

Immediately surrounding the metal of the head 6 and seated in the head 4 is a compressible gasket 11 made of any suitable material and immediately behind the gasket is formed an annular chamber 12 which is in communication with the head passage through the head by channels 13 which pass through the cone 9 and through the head 4 from said passage into the chamber 12. When the heads are coupled up in the manner shown, the air pressure in the pipes passes around through the channels 13 and presses the gasket 11 against the head 6 thus maintaining a practically air-tight joint.

Having thus described the invention, what is claimed is—

A coupling for high pressure fluids comprising a socketed head, a ball head situated therein, a cylindrical member mounted in the socket head and adapted to hold the ball head in position, said member having a tapering interior and a plurality of channels extending transversely therethrough, said socketed head having an annular chamber formed therein and channels leading into the chamber and communicating with the channels in the holding member, and a gasket surrounded by said chamber and adapted to be pressed into engagement with the ball head by the pressure of fluid in the cup.

In testimony whereof I affix my signature in presence of two witnesses.

ANTHONY METOSH.

Witnesses:
    FRANK B. METOSH,
    WALTER E. LANSING.

Copies of this patent may be obtained for five cents each, by addressing the "Commissioner of Patents, Washington, D. C."